United States Patent
Kuo

(10) Patent No.: US 12,140,802 B2
(45) Date of Patent: Nov. 12, 2024

(54) 1D APODIZED GRATING DEVICES AND METHODS FOR SUPPRESSING OPTICAL NOISE

(71) Applicant: Taiwan Semiconductor Manufacturing Co., Ltd., Hsin-Chu (TW)

(72) Inventor: Feng-Wei Kuo, Zhudong Township, Hsinchu County (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 602 days.

(21) Appl. No.: 17/334,365

(22) Filed: May 28, 2021

(65) Prior Publication Data

US 2022/0381991 A1 Dec. 1, 2022

(51) Int. Cl.
*G02B 6/34* (2006.01)
*G02B 6/30* (2006.01)

(52) U.S. Cl.
CPC ........... *G02B 6/34* (2013.01); *G02B 6/30* (2013.01)

(58) Field of Classification Search
CPC .......... G02B 6/42; G02B 6/4206; G02B 6/30; G02B 6/34
See application file for complete search history.

(56) References Cited

U.S. PATENT DOCUMENTS

| | | | |
|---|---|---|---|
| 2014/0270642 A1* | 9/2014 | Frish | G02B 6/34 264/1.27 |
| 2022/0152724 A1* | 5/2022 | Luo | G02B 6/0016 |

FOREIGN PATENT DOCUMENTS

| | | |
|---|---|---|
| CN | 1116719 A | 2/1996 |
| CN | 107040318 A | 8/2017 |
| CN | 107332105 A | 11/2017 |
| CN | 108233172 A | 6/2018 |
| CN | 111492313 A | 8/2020 |

OTHER PUBLICATIONS

Zhu, Kehan, et al. "Behavioral modeling and characterization of silicon photonic Mach-Zehnder modulator." 2017 IEEE 60th International Midwest Symposium on Circuits and Systems (MWSCAS). IEEE, 2017., 989-992.
Li, Hongqiang, et al. "High-performance binary blazed grating coupler used in silicon-based hybrid photodetector integration." Optical Engineering 53.9 (2014): pp. 057105-1-057105-6.
Chen, Xia, et al. "Apodized waveguide grating couplers for efficient coupling to optical fibers." IEEE Photonics Technology Letters 22.15 (2010): 1156-1158.

* cited by examiner

*Primary Examiner* — Michael P Mooney
(74) *Attorney, Agent, or Firm* — Duane Morris LLP

(57) ABSTRACT

A grating coupler integrated in a photonically-enabled circuit and a method for fabricating the same are disclosed herein. In some embodiments, the grating coupler includes a substrate comprising a silicon wafer, a first grating region etched into the substrate, wherein the first grating region comprises a first plurality of gratings having a first predetermined height, and a second grating region etched into the substrate, wherein the second grating region comprises a second plurality of gratings having a second predetermined height and wherein the first and second predetermined heights are not identical.

19 Claims, 5 Drawing Sheets

1D APODIZED GRATING DEVICES AND METHODS FOR SUPPRESSING OPTICAL NOISE

BACKGROUND

Photonic integration is a key technology for future advancement in optical communication technology. Scaling down of the optical building elements enables cost-effective, complex and ultra-compact photonic circuits, i.e. chips which comprise integrated grating couplers (GCs) formed on or in a substrate and which are interconnected by an optical device that couples the light into or out of the photonic integrated circuit (PIC) into free space or to an optical fiber.

These grating couplers are advantageous because they can be compactly incorporated together in or on a planar platform, i.e. semiconductor substrate, to form planar packages analogous to integrated circuits (ICs). Moreover, GCs provide compact size, ease of fabrication, flexible placement, and wafer-level testing. Furthermore, GCs, analogous to conductor traces in semiconductor electronic ICs, are mounted in or on the silicon substrate and may be employed to guide light to various optical, electro-optical, and optoelectronic devices or components on the PIC.

In many silicon photonics applications, it is desirable to have GCs with high coupling efficiency and wide bandwidth. Moreover, sensing applications using visible light such as LiDAR, GCs with reduced back-reflection are needed. The optical noise caused by back-reflections may increase the optical instability in interferometric devices and generate ripples and/or oscillations. Additionally, optoelectronic devices such as lasers and photodiodes are typically sensitive to back-reflection because they contribute to noise generation, especially in optical circuits where optical feedback schemes are implemented. A typical back-reflection into the on-chip waveguide for a high-efficiency grating coupler may be around −17 dB, while high back-reflections of −10 dB and −8 dB have been reported as well. Current GCs and methods for fabricating the same do not provide high coupling efficiency and low back reflection characteristics. For this reason, low back-reflective GCs and methods for fabricating the same are desired for visible light applications.

The information disclosed in this Background section is intended only to provide context for various embodiments of the invention described below and, therefore, this Background section may include information that is not necessarily prior art information (i.e., information that is already known to a person of ordinary skill in the art). Thus, work of the presently named inventors, to the extent the work is described in this background section, as well as aspects of the description that may not otherwise qualify as prior art at the time of filing, are neither expressly nor impliedly admitted as prior art against the present disclosure.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

Figure 1:
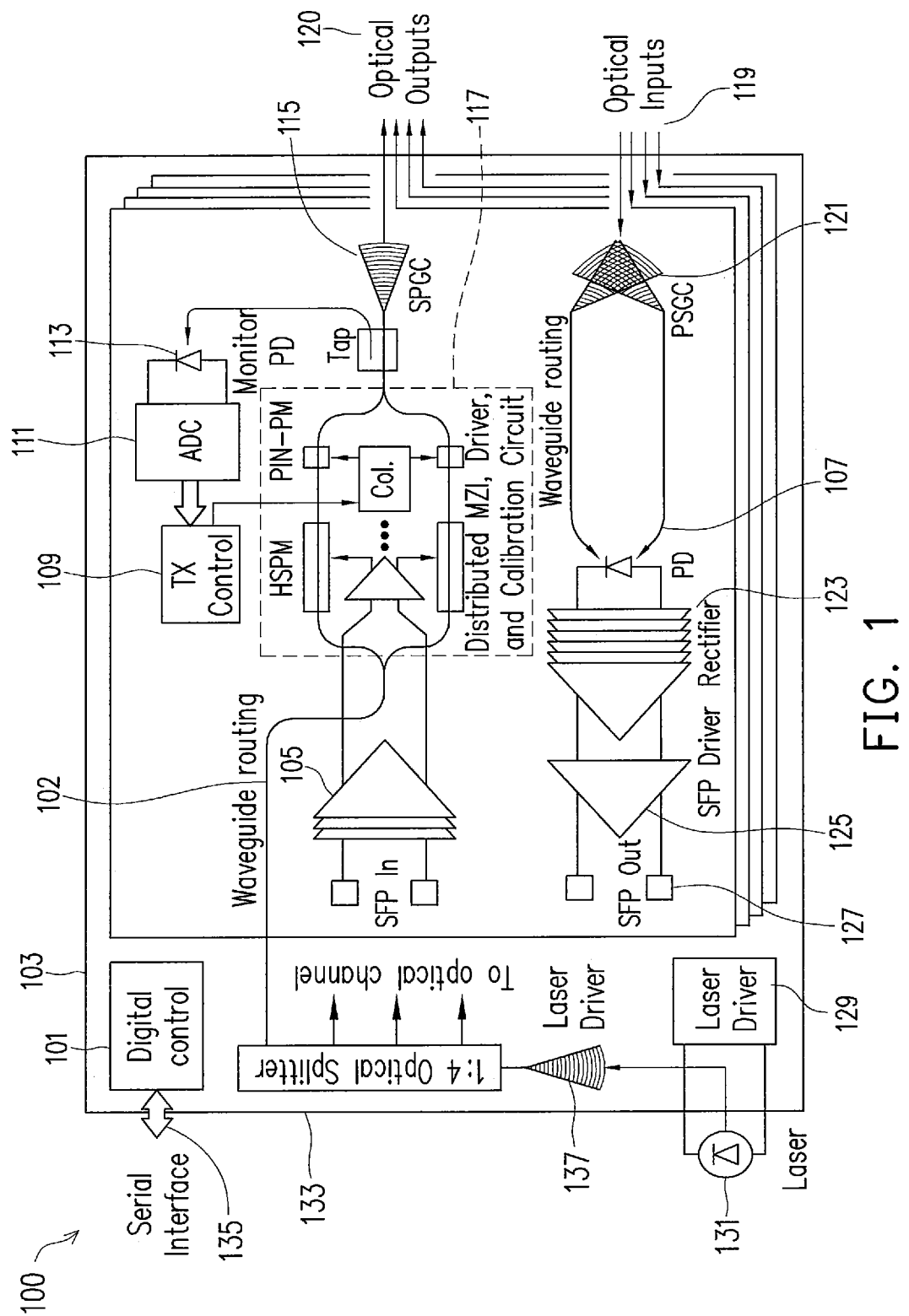
FIG. 1 is a schematic illustrating an exemplary optical transceiver, in accordance with some embodiments.

As illustrated in FIG. 1, the exemplary optical transceiver 100 may include optical modulators 117, monitor photodiode 113, and optical grating couplers 115 and 121. In some embodiments, the optical modulator 117 may include a two arm waveguides, a high speed phase modulator (HSPM), a p-i-n phase modulator (PIN-OM), a driver, a Mach-Zehnder interferometric (MZI) modulator, and a calibration circuit. Furthermore, the optical modulator 117 may receive a continuous wave (CW) light input. In addition, the input CW light is split into two beam lights by a 1×2 coupler, the split lights are then modulated in phase in the two arm waveguides, and the split phase modulated lights are coupled by the 2×1 coupler at the output. The exemplary optical transceiver 100 may also include electrical devices and circuits comprising amplifiers 105 and 125, an analog to digital converter circuit 111, a digital control circuit 101, a photodiode(s) 107 and control section 109. The amplifiers 105 and 125 may comprise transimpedance and limiting amplifiers (TIA/LAs), for example. In some embodiments, the amplifiers 105 receive an I-channel data signal and a Q-channel data as an input to the optical transceiver 100 through various input interfaces, for example small form-factor pluggable (SFP) interface. Moreover, the amplifiers 105 output an amplified version of the input I-channel and Q-channel data. As shown in FIG. 1, the modulator 117 receives the I-channel data signal and the Q-channel data signal from the amplifiers 105. In some embodiments, the exemplary optical transceiver 100 may further comprise a photonics die 103 with a laser assembly. In some embodiments, the laser assembly may comprise one or more semiconductor lasers 131, lenses, rotators for directing one or more continuous-wave (CW) optical signals, and one or more laser driver 129.

In further embodiments, the exemplary optical transceiver 100 may include couplers 137 that are configured to receive an optical signal from the laser 131 and an optical splitter 133 that is configured to split the optical signal into four roughly equal power optical signals. In various embodiments, the split power signals may be transmitted from the optical splitter 133 to the optical modulators 117 through optical waveguides. In some embodiments, the optical splitter 133 may be coupled to at least one input waveguide 137 and at least four output waveguides 102. In some embodiments, the optical splitter 133 may comprise a low-loss Y-junction power splitters. In some embodiments, the at least one input waveguide 137 may comprise a single polarization grating coupler (SPGC).

In some embodiments, the optical modulators 117 may comprise Mach-Zehnder or ring modulators, for example, and enable the modulation of the continuous-wave (CW) laser input signal. The optical modulators 117 may also comprise high-speed and low-speed phase modulation sections and are controlled by the control sections 109. In some embodiments, at least one of outputs of each of the optical modulators 117 may be optically coupled to an optical output 120 such as an optical fiber via the grating coupler 115. In some embodiments, the grating coupler 115 may comprise a single polarization grating coupler (SPGC). The other outputs of the optical modulators 117 may be optically coupled to the monitor photodiode 113 that is configured to provide a feedback path from the output of the optical modulators 117 to the section control 109.

Furthermore, the exemplary optical transceiver 100 may also utilize a grating coupler 121 for receiving optical signals from optical inputs 119. In other embodiments, the grating coupler 121 may comprise single polarization grating couplers (SPGC) and/or polarization splitting grating couplers (PSGCs). In instances where a PSGC is utilized, two input, or output, waveguides may be utilized.

In some embodiments, the exemplary optical transceiver 100 employs the photodiode(s) 107, which may be implemented with epitaxial germanium/SiGe films deposited directly on silicon. In other embodiments, photodiode(s) 107 may comprise high-speed heterojunction phototransistors, for example, and may comprise germanium (Ge) in the collector and base regions for absorption in the 1.3-1.6 μm optical wavelength range, and may be integrated on a CMOS silicon-on-insulator (SOI) wafer. The photodiode(s) 107 may be configured to convert optical signals received from the PSGCs 121 into electrical signals that are communicated to a receiver (Rx) 123 which may be configured to combine data streams, and demultiplex the received optical signals. Furthermore, received optical signals may be amplified by a transimpedance amplifier 125, for example, and subsequently communicated to a small form-factor pluggable (SFP) interface circuitry 127.

In some embodiments, the exemplary optical transceiver 100 may also include a digital control circuit 101 coupled to a serial interface 135 and configured to communicate received optical data through the serial interface 135.

As shown in FIG. 1, grating couplers 115 and 121 of the optical transceiver 100 enable coupling of light into and out of the integrated circuit comprising the optical transceiver 100. In some embodiments, the grating couplers 115 and 121 may include regions of medium etched and shallow etched gratings.

In some embodiments, transmit or receive optical paths of the optical transceiver 100 may include an optical waveguide connected to the grating couplers 115 and 121. In some embodiments, the grating coupler 121 may also be referred to as a grating coupler pair. In some embodiments, the first coupler of the grating coupler pair 121 may be configured for the transverse electric (TE) mode and the second coupler of the grating coupler pair 121 may be configured for the transverse magnetic (TM) mode.

Figure 2:
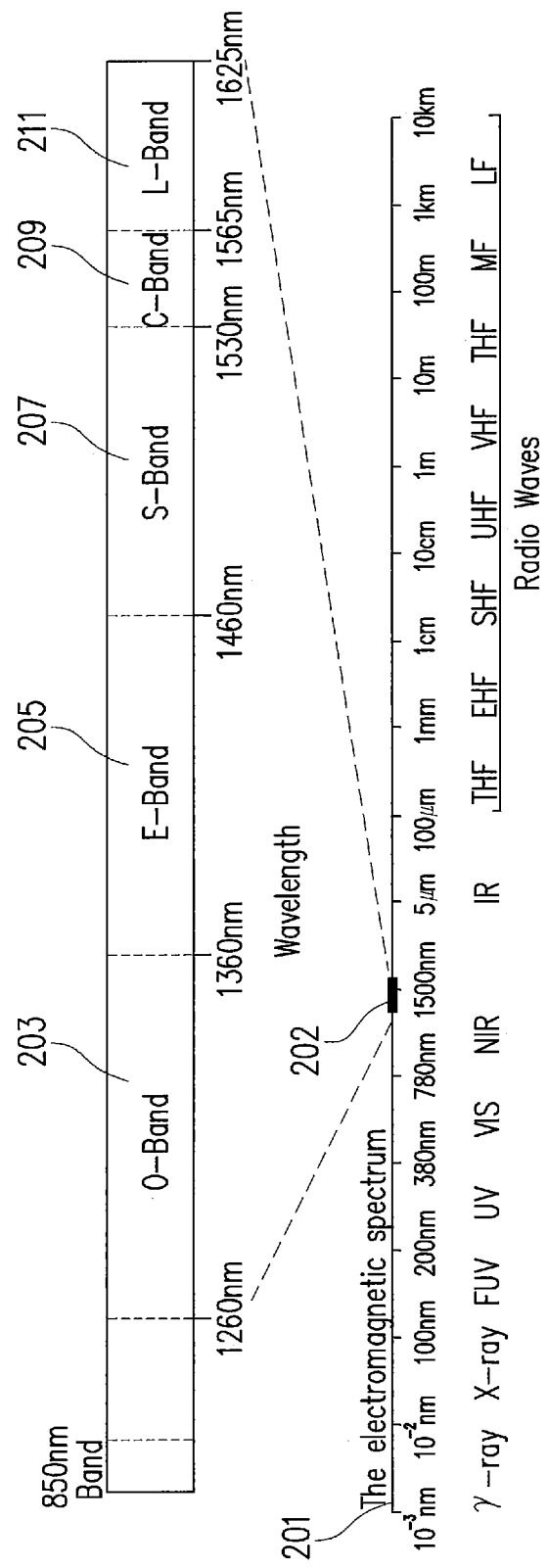
FIG. 2 illustrates an electromagnetic spectrum and the optical communication wavelength bands, in accordance with some embodiments.

In some embodiments, the grating couplers 115 and 121 may be used to receive or transmit optical communication in an electromagnetic spectrum 201 illustrated in FIG. 2. For example, the grating couplers 115 and 121 may receive optical signals in a wavelength region ranging from 1260 nanometers to 1625 nanometers. In some embodiments, the grating couplers 115 and 121 may be configured to receive and/or transmit optical signal in at least one of the five wavelength bands: O-band 203, E-band 205, S-band 207, C-band 209, and L-band 211. In some embodiments, the O-band 203 having an optical light wavelengths in the range of 1260 nanometers to 1360 nanometers exhibits a minimum chromatic dispersion. As such, optical fibers coupled to the grating couplers 115 and/or 121 and carrying optical communication in the O-band 203 may exhibit a small transmission loss.

In some other embodiment, the optical fibers coupled to the grating couplers 115 and/or 121 and carrying optical communication in metro, long-haul, ultra-long-haul, or submarine optical networks may also exhibit low loss in the C-band 209 having an optical light wavelengths in the range of 1530 nanometers to 1565 nanometers. In some embodiments, when the bandwidths available in the C-band 209 is not sufficient, the optical fibers coupled to the grating couplers 115 and/or 121 may carry optical communication in the L-band 211, having optical wavelengths in the range of 1565 nanometers to 1625 nanometers. In various embodiments, the optical fibers coupled to the grating couplers 115 and/or 121 and carrying optical downstream communication in the S-band 207, having optical wavelengths in the range of 1460 nanometers to 1530 nanometers, may also be used in Passive-Optical Networks (PONs). Despite the attenuation due to residual water (OH group) impurity in the optical fiber glass, the E-band 205, having optical wavelengths in the range of 1360 nanometers to 1460 nanometers, may also be used to carry optical communication using an optical fiber coupled to the grating couplers 115 and/or 121, alas it may be the least desired among the discussed optical bands.

Figure 3:
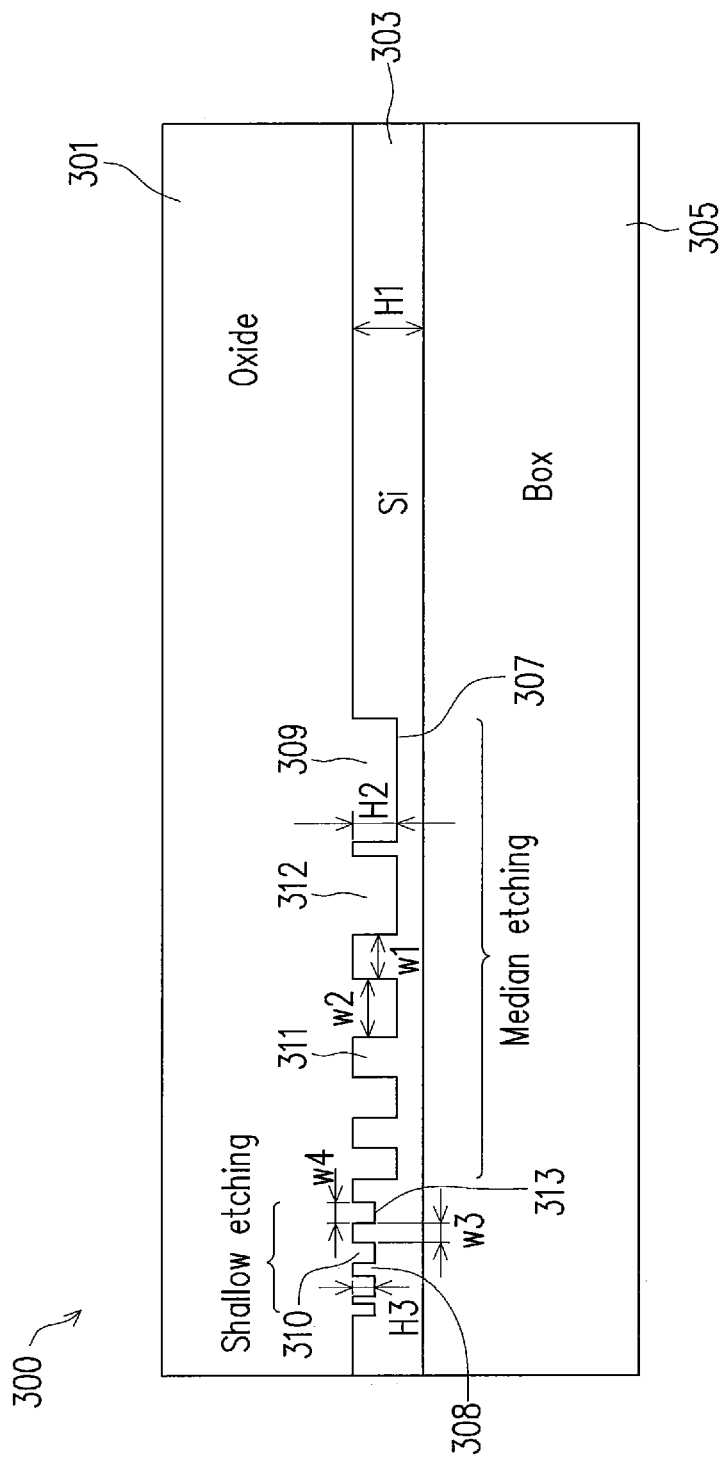
FIG. 3 is a sectional view of an integrated 1D apodized GC assembly for reducing back-reflection noise, in accordance with some embodiments.

FIG. 3 illustrates a cross sectional view of a grating coupler assembly 300 of the grating couplers 115 and/or 121 configured with two distinct etching levels, in accordance with some embodiments. The grating coupler assembly 300 couples a single polarization component of an out-of-plane, optical beam with a waveguide polarization mode. In some embodiments, the grating coupler assembly 300 may comprise a substrate 305. In some embodiments, the substrate 305 may be a silicon (Si) substrate used in the fabrication of integrated circuits, which may also comprise a layer of silicon dioxide formed thereon. In other embodiments, the substrate 305 may be a glass substrate.

In an embodiment, the grating coupler assembly 300 is formed in a portion of a silicon layer 303 that also defines the silicon waveguide coupled with the grating coupler assembly 300. The overall thickness of the silicon layer 303 is denoted by H1. The some embodiments, the thickness H1 of the silicon layer 303 may preferably range from about 200 nanometers to 500 nanometers so as to maximize the coupling efficiency (CE) of the grating coupler assembly 300.

In some embodiments, the grating coupler assembly 300 and the silicon waveguide may be covered by one or more transparent layers 301, which may be reserved for other PIC functions. In some embodiments, the one or more transparent layers 301 may include of a cladding layer formed from $SiO_2$. In other embodiments, the silicon layer 303 containing the grating coupler assembly 300 may have a refractive index $n_{eff}$, while the cladding layer of the one or more transparent layers 301 may have a refractive index $n_{cladding}$. The refractive index of the silicon layer 303 may be greater than the refractive index of the cladding layer of the one or more transparent layers 301.

In an embodiments, the disclosed 1D grating coupler assembly 300 may comprise a plurality of grating elements 311. In some embodiments, the plurality of grating elements 311 may be configured to couple an out-of-plane, received or transmitted optical beam with the integrated waveguide. In an embodiment, out-of-plane optical beam may couple with the plurality of grating element 311 via the free-space propagation and/or an optical fiber.

In some embodiments, the grating coupler assembly 300 includes a first grating lines 311 and first grating spaces 312. In some embodiments, a width w1 of the first grating lines 311, a width w2 of the first grating spaces 312 may be optimized numerically to maximize mode overlap between the optical fiber and grating coupler assembly 300, resulting in a maximum coupling efficiency CE in the given communication band (e.g., C-band). Moreover, the number of first grating lines 311 is also optimized numerically to maximize the coupling efficiency CE.

In some embodiments, the first grating lines 311 may preferably be etched to the silicon layer 303. Dry or wet etching combined with lithography can be used for this purpose. In some embodiments, the grating coupler assembly 300 may include two or more distinct etching regions. For example, the grating coupler assembly 300 may include a median etched and a shallow etched regions. As such, a first height H2 309 of the first grating lines in the median etched region, measured relative to a first grating floor 307, may preferably range from about 70 nanometers to 210 nanometers. Furthermore, a second height H3 of a second grating lines 308 in the shallow etched region, measured relative to a second grating floor 313, may preferably range from about 100 nanometers to 210 nanometers. One exemplary advantage of having two or more distinct etched regions in the grating coupler assembly 300 is to reduce the back-reflection loss and to increase the coupling efficiency CE in a given communication band.

In some embodiments, the forming of the median and shallow etched regions may include sequentially (e.g., performing two etching steps) forming predetermined etching mask patterns for the median and shallow etched regions. In some embodiments, the distinct patterned photoresists formed by any of exposure methods, such as electron beam (EB) exposure and holographic exposure, may be used as masks to dry etch the silicon layer 303 so as to form the grating lines in the median etched and shallow etched regions.

In some embodiments, the width w1 of the grating lines 311 in the medium etched region may differ from a width w3 of the second grating lines 308 in the shallow etched region. Moreover, the width w2 of the first grating spaces 312 may also differ from a width w4 of the second grating spaces 310. In some embodiments, the width w1 may range from about 10 nanometers to 1000 nanometers, the width w2 may range from about 10 nanometers to 1000 nanometers, the width w3 may range from about 10 nanometers to 1000 nanometers, and the width w4 may range from about 10 nanometers to 1000 nanometers. In some embodiments, the width w3 of the second grating lines 308, the width w4 of the second grating spaces 308 may be optimized numerically to maximize mode overlap between the optical fiber and grating coupler assembly 300, resulting in a maximum coupling efficiency CE and a minimum back reflection loss in the given communication band (e.g., C-band). Moreover, the number of second grating lines 308 may also be optimized numerically to maximize the coupling efficiency CE and to reduce the back reflection loss.

In some embodiments, the median and shallow etched grating regions can be fabricated with any semiconductor fabrication techniques. Moreover, the grating coupler assembly 300 with two or more etched grating regions may be included in optical I/O interface modules or in high speed optical communication systems.

Geometric variations originating from process (lithography/etching) variations may negatively affect the sensitivity to noise and coupling efficiency of the PIC grating couplers. One exemplary advantage of forming multiple etched grating regions (e.g., medium and shallow) in the grating coupler assembly 300 is reduced the negative effects of geometric variations by simply shifting the operating wavelength of the optical beam.

As shown in FIG. 3, the out-of-plane optical beam may be incident on the grating coupler assembly 300 at an incident angle θ. In some embodiment, the out-of-plane optical beam incident on the grating coupler assembly 300 may be coupled with the corresponding coupled waveguide when $$\sin\theta = \frac{n_{eff} - \frac{m\lambda}{a}}{n_{cladding}} \quad (1)$$

where $n_{cladding}$ is the refractive index of the cladding layer of the one or more transparent layers 301, θ is the incident angle 306, $n_{eff}$ is the refractive index of the silicon layer 303, λ is a wavelength of the incident out-of-plane optical beam, a is the grating period 409, and m is an integer representing the diffraction order (equals to 1 for 1D grating couplers). Moreover, the etching depths (e.g., H2 and H3) may result in a shift of $n_{eff}$. More specifically, an increase in etching depths may reduce $n_{eff}$. In some embodiments, maximum coupling efficiency with the medium and shallow etched grating regions may be achieved with θ the incident angle 306 set in the rage from about 5° to 15°.

Figures 4A, 4B:
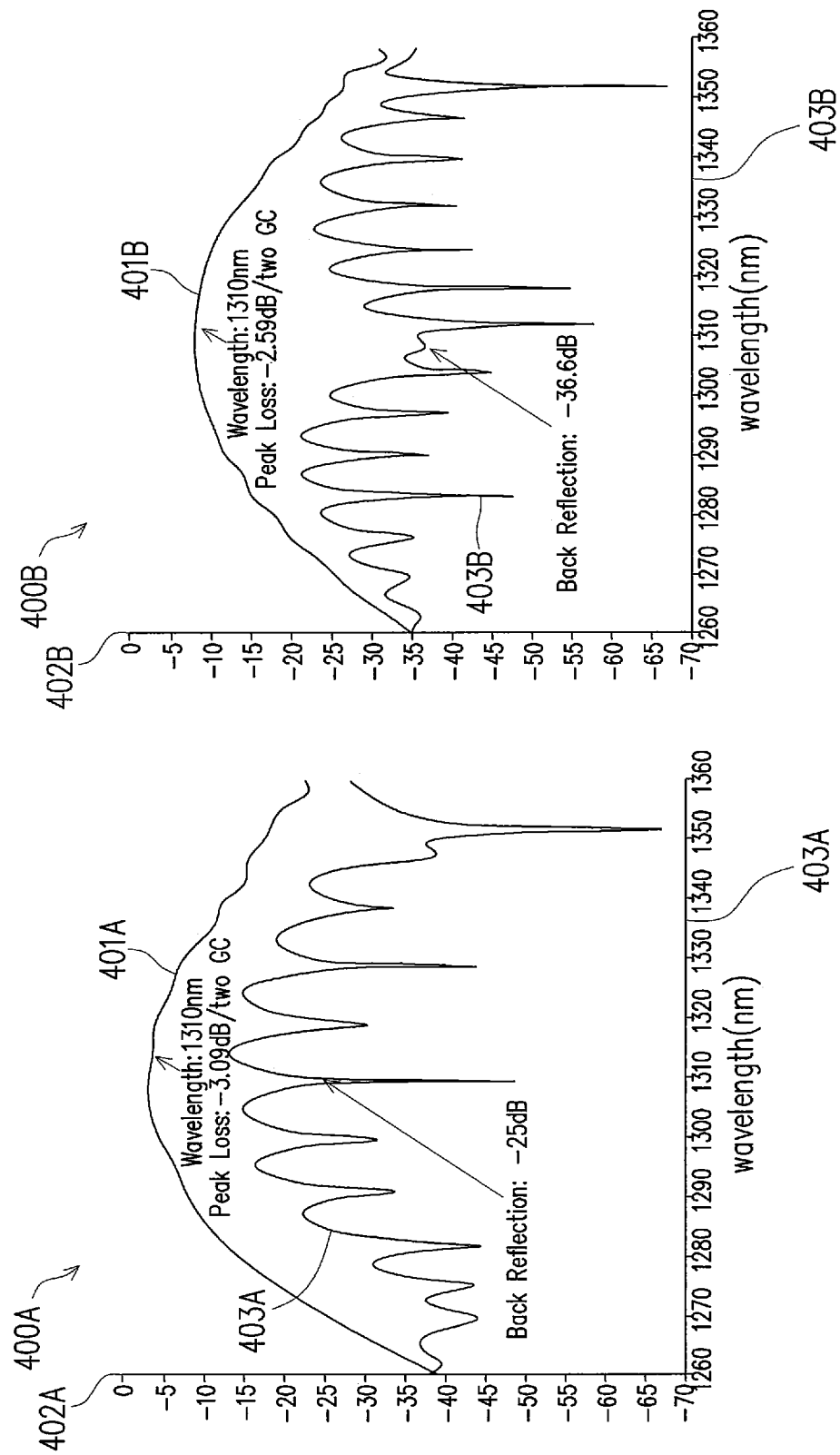
FIG. 4A illustrates a measured coupling loss and a back-reflection for an apodized GC having one grating region with a single level of etched gratings, in accordance with some embodiments.
FIG. 4B illustrates measured coupling loss and back-reflection for an apodized GC having two grating regions with two distinct levels of etched gratings, in accordance with some embodiments.

FIG. 4A illustrates a measured coupling and back-reflection losses 400A for an apodized GC having one grating region with a single level of etched gratings and with an optical beam having wavelength of 1310 nanometers, in accordance with some embodiments. FIG. 4A shows a horizontal axis 403A representing a wavelength of the optical beam in nanometers (nm). A vertical axis 402A represents coupled power in dB. A solid plot line 401A represents the apodized grating coupler's coupling loss. A second solid plot line 405A represents the apodized grating coupler's silicon waveguide back-reflection. The coupling loss of the example apodized grating coupler embodiment, having a single level of etched gratings, has a peak of −3.09/2 dB at the optical wavelength range near 1310 nm, as shown by the first solid plot line 401A. Other embodiments may be designed for other peak wavelengths. The back-reflection of the example apodized grating coupler embodiment, having a single level of etched gratings, shows a minimum −25 dB near 1310 nm, as shown by the second solid plot line 405A. Other embodiments may have a different magnitude minimum at a different wavelength. In various embodiments, the grating coupler may operate in an over-coupled regime where the minimum back-reflection wavelength may coincide with or be near to the maximum coupling loss wavelength.

FIG. 4B illustrates a measured coupling and back-reflection losses 400B for an apodized GC having one grating region with two distinct etching levels and with an optical beam having wavelength of 1310 nanometers, in accordance with some embodiments. FIG. 4B shows a horizontal axis 403B representing a wavelength of the optical beam in nanometers (nm). A vertical axis 402B represents coupled power in dB. A solid plot line 401B represents the coupling loss of apodized grating coupler having median and shallow etching levels. A second solid plot line 405B represents the back-reflection loss of the apodized grating coupler having a median and shallow etching.

As shown in FIG. 4B, the coupling loss of the example apodized grating coupler embodiment, having a median and shallow etching, has a peak of −2.59/2 dB at the optical wavelength range near 1310 nm. As such, the grating coupler with a median and shallow etching has an improved coupling efficiency at the optical wavelength range near 1310 nm compared to the grating coupler with a single level of etched gratings. Other embodiments may be designed for other peak wavelengths. The back-reflection of the example apodized grating coupler embodiment, having a median and shallow etching, shows a minimum −36.6 dB near 1310 nm, as shown by the second solid plot line 405B. As such, the grating coupler with a median and shallow etching has a lower back-reflection loss at the optical wavelength range near 1310 nm compared to the grating coupler with a single level of etched gratings. Other embodiments may have a different magnitude minimum at a different wavelength. One exemplary advantage of the lower back-reflection loss is the reduced optical noise and increased optical stability. Additionally, lower back-reflection provides a reduction in sensitivity of optical feedback schemes to noise.

Figure 5:
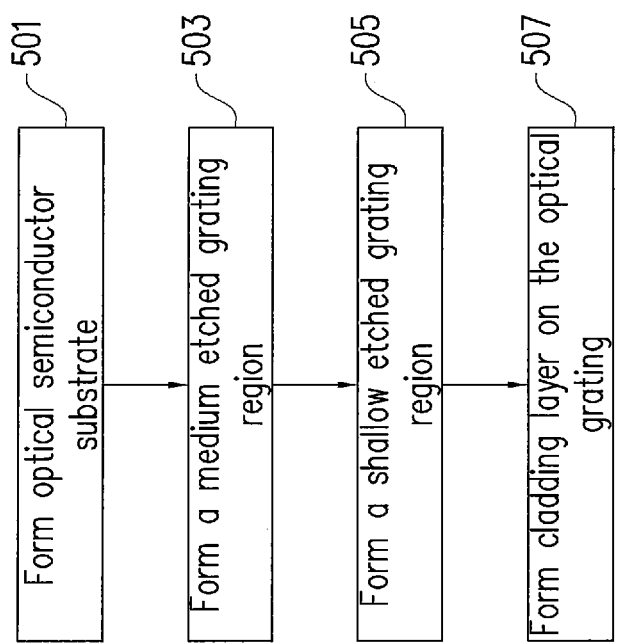
FIG. 5 illustrates a flow diagram of a method for fabricating an apodized GC having two grating regions with two distinct levels of etched gratings, in accordance with some embodiments.

Turning now to FIG. 5, illustrated is a flow diagram of a method for fabricating an optical grating coupler having medium and shallow grating regions, in accordance with some embodiments. The Flow diagram as illustrated herein provide examples of sequences of various process actions. Although shown in a particular sequence or order, unless otherwise specified, the order of the actions can be modified. Thus, the illustrated implementations should be understood only as an example, and the process can be performed in a different order, and some actions may be performed in parallel. Additionally, one or more actions can be omitted in various embodiments of the invention; thus, not all actions are required in every implementation. Other process flows are possible.

In some embodiments, a physical layout of the grating coupler can be used to complete and manufacture the photonically-enabled integrated circuit using a semiconductor fabrication process. The physical layout, often referred to as "geometry," may be used to generate the integrated circuit tooling, which is a series of masks, each representing a layer for the integrated circuit. The tooling is then used by manufacturers to fabricate the photonically-enabled integrated circuit.

As such, FIG. 5 illustrates a step 501, in which a substrate layer 303 may be formed in accordance with the physical layout grating coupler. In one embodiment, the fabricated substrate 303 is a single crystal Si wafer. In other embodiments, the fabricated substrate 303 may be an InP wafer.

At step 503, a medium etched grating region may be formed in the substrate layer 303 using a plasma etch process, e.g., reactive-ion etch. In other embodiments, the medium etched grating region may be formed using a dry etching process. The medium etched grating region may include patterned gratings having a width w1 and a width w2 between patterned gratings. In some embodiments, the width w1 of the patterned grating lines in the medium etched region and the widths w2 of the open spaces between the gratings may be uniform. The first height H2 309 of the gratings in the medium etched region may be selected based on the intended wavelength of the operation of the grating coupler. In a nonlimiting embodiment, the first height H2 309 preferably ranges from about 70 nanometers to 210 nanometers. Those skilled in the pertinent art will appreciate that the first height H2 309 may vary somewhat over the medium etched region due to variations in the etch process.

At step 505, a shallow etched grating region may be formed in the substrate layer 303 using a plasma etch process, e.g., reactive-ion etch. In other embodiments, the shallow etched grating region may be formed using a dry etching process. The shallow etched grating region may include patterned gratings having a width w3 and a width w4 between patterned gratings. In some embodiments, the width w3 of the patterned grating lines in the shallow etched region and the widths w4 of the open spaces between the gratings may be uniform. The second height H3 315 of the gratings in the shallow etched region may be selected based on the intended wavelength of the operation of the grating coupler. In a nonlimiting embodiment, the second height H3 315 preferably ranges from about 100 nanometers to 210. Those skilled in the pertinent art will appreciate that the second height H3 315 may vary somewhat over the shallow etched region due to variations in the etch process. In further embodiments, three or more grating regions may be etched in the silicon substrate having distinct grating heights.

In FIG. 5, illustrating a step 507, a cladding layer 301 comprised of a low refractive index material such as a $SiO_2$ film is formed so as to cover the gratings in the medium and shallow etched regions. In some embodiments, the thickness of the cover $SiO_2$ film may change for each region of the gratings so that the diffraction intensity gradually increases towards the terminal end of the grating coupler.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations are used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, signal, etc. that is physically constructed, programmed, arranged and/or formatted to perform the specified operation or function.

Furthermore, a person of ordinary skill in the art would understand that various illustrative logical blocks, modules, devices, components and circuits described herein can be implemented within or performed by an integrated circuit (IC) that can include a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A processor programmed to perform the functions herein will become a specially programmed, or special-purpose processor, and can be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the broadest scope consistent with the novel features and principles disclosed herein.

What is claimed is:

1. A grating coupler comprising:
a substrate comprising a silicon wafer;
a first grating region having a first floor etched into the substrate,
wherein the first grating region comprises a first plurality of gratings having a first predetermined height measured relative to the first floor; and
a second grating region having a second floor etched into the substrate,
wherein the second grating region comprises a second plurality of gratings having a second predetermined height measured relative to the second floor,
wherein the first and second predetermined heights are not identical and a relative distance between the first floor and the second floor is not zero.

2. The grating coupler of claim 1, wherein the first predetermined height measured relative to the first floor is in the range of 70 nanometers to 210 nanometers.

3. The grating coupler of claim 1, wherein the second predetermined height measured relative to the second floor is in the range of 100 nanometers to 210 nanometers.

4. The grating coupler of claim 1, wherein a thickness of the substrate is in the range of 200 nanometers to 500 nanometers.

5. The grating coupler of claim 1, further comprising a third grating region etched into the substrate, wherein the third grating region comprises a third plurality of gratings having a third predetermined height that is not identical to the first and second predetermined heights.

6. The grating coupler of claim 1 configured to operate near 1310 nanometers optical wavelength.

7. An optical communication system, comprising:
an optical fiber; and
a photonic integrated circuit (PIC) comprising a grating coupler assembly configured to couple optical light carried in the optical fiber into or out of the PIC, wherein the grating coupler assembly comprises:
a substrate comprising a silicon wafer;
a first grating region having a first floor etched in the substrate,
wherein the first grating region comprises a first plurality of gratings having a first predetermined height measured relative to the first floor; and
a second grating region having a second floor etched in the substrate,
wherein the second grating region comprises a second plurality of gratings having a second predetermined height measured relative to the second floor,
wherein the first and second predetermined heights are not identical and a relative distance between the first floor and the second floor is not zero.

8. The optical communication system of claim 7, wherein the first predetermined height measured relative to the first floor is in the range of 70 nanometers to 210 nanometers.

9. The optical communication system of claim 7, wherein the second predetermined height measured relative to the second floor is in the range of 100 nanometers to 210 nanometers.

10. The optical communication system of claim 7, wherein a thickness of the substrate is in the range of 200 nanometers to 500 nanometers.

11. The optical communication system of claim 7, wherein an angle between the optical fiber and a normal to a surface of the grating coupler assembly is in the range of 5° to 15°.

12. The optical communication system of claim 7, wherein the optical communication system is configured to operate near 1310 nanometers optical wavelength.

13. A grating coupler comprising:
a substrate comprising a silicon wafer;
a first grating region having a first floor etched into the substrate,
wherein the first grating region comprises a first plurality of gratings having a first predetermined height measured relative to the first floor;
a second grating region having a second floor etched into the substrate, wherein the second grating region comprises a second plurality of gratings having a second predetermined height measured relative to the second floor; and
a third grating region having a third floor etched into the substrate, wherein the third grating region comprises a third plurality of gratings having a third predetermined height relative to the third floor that is not identical to the first and second predetermined heights,
wherein the first, second and third predetermined heights are not identical and a relative distance between the first floor and the second floor is not zero, a relative distance between the first floor and the third floor is not zero, and a relative distance between the second floor and the third floor is not zero.

14. The grating coupler of claim 13, wherein the first predetermined height measured relative to the first floor is in the range of 70 nanometers to 210 nanometers.

15. The grating coupler of claim 13, wherein the second predetermined height measured relative to the second floor is in the range of 100 nanometers to 210 nanometers.

16. The grating coupler of claim 13, wherein a thickness of the substrate is in the range of 200 nanometers to 500 nanometers.

17. The grating coupler of claim 1 configured to operate near 1310 nanometers optical wavelength.

18. The grating coupler of claim 13, wherein the first and second plurality of gratings have uniform widths.

19. The grating coupler of claim 13, wherein a width of each grating of the first and second plurality of gratings is selected to minimize a coupling and back-reflection losses between the grating coupler and an optical fiber coupled to the grating coupler.

* * * * *